Oct. 6, 1970

B. M. EPSTEIN 3,533,071

DATA TRANSFER SYSTEM AND METHOD

Filed April 12, 1967

INVENTOR
B. M. EPSTEIN
BY
*G. E. Hirsch Jr.*
ATTORNEY

Oct. 6, 1970    B. M. EPSTEIN    3,533,071
DATA TRANSFER SYSTEM AND METHOD
Filed April 12, 1967    6 Sheets—Sheet 6

United States Patent Office 3,533,071
Patented Oct. 6, 1970

3,533,071
DATA TRANSFER SYSTEM AND METHOD
Barry M. Epstein, Parsippany, N.J., assignor to Bell Telephone Laboratories, Incorporated, Murray Hill and Berkeley Heights, N.J., a corporation of New York
Filed Apr. 12, 1967, Ser. No. 630,359
Int. Cl. G11b 5/02, 19/00, 27/00
U.S. Cl. 340—172.5             9 Claims

ABSTRACT OF THE DISCLOSURE

Continuously recorded data is transferred in blocks from a data tape to a computer tape without the use of a buffer. So-called copy control pulses, placed on the data tape during the recording process, control the transfer of data by controlling both the relative motion of the data and computer tapes and the operation of associated readout apparatus. The gaps between contiguous blocks of data on the computer tape are proportional to the length of the copy control pulses.

Further, address information superimposed on the copy control pulses allows the transfer of only preselected data blocks from the data tape to the computer tape.

BACKGROUND OF THE INVENTION

This invention relates to data transfer and, in particular, to the transfer, in blocks, of continuously recorded data from a data tape to a computer tape without the use of a buffer.

In flight testing, seismic wave detection, and similar ventures, large amounts of data are generated in short times. Usually, for most efficient tape use, the data is continuously recorded in digital form on multitrack magnetic tape. For analysis, the data must be transferred from the data tape to a computer memory or to computer tapes used as auxiliary memories.

Data stored on computer tapes must be arranged in a specified format. For example, the data on some IBM computer tapes is placed in 2,000 word blocks with a three-quarter inch gap between contiguous blocks. Each word contains 36 data bits and is divided into six so-called characters of six bits each. In addition, each character has associated with it one parity bit. The problem is to transfer contiguous blocks of the continuously recorded data from the data tape to the computer tape with no overlap of data from block to block, no loss of data between blocks, and with minimum expenditure of money and time. This problem is complicated by the fact that the time necessary to bring the data tape up to speed usually varies directly with the amount of tape on the data reel while, on the other hand, a positive drive usually brings the computer tape up to speed in a specified time.

Prior art systems place a buffer between the data tape and the computer tape. Information read at one rate from the data tape is stored in the buffer prior to transfer at a second rate to the computer tape. Buffers, however are expensive.

SUMMARY OF THE INVENTION

This invention eliminates the need for a buffer in the transfer of data tape to a computer tape. This is done by using so-called copy control pulses, periodically placed on a separate track of the multitrack data tape during the recording process, to control the transfer of data. The copy control pulses define the blocks of data on the data tape. The lengths of the copy control pulses determine the lengths of the gaps between adjacent blocks of data on the computer tape.

In brief, to transfer data according to this invention, the data tape is brought to operating speed before the leading edge of a first copy control pulse is detected by a readout device. When this leading edge is detected, the computer tape is started and brought rapidly to operating speed. Shortly thereafter, the trailing edge of the first copy control pulse starts the transfer of data from the data tape to the computer tape. When the trailing edge of the next following, or second, copy control pulse is detected, a "block" of data has been transferred and data transfer is stopped. The computer and data tapes are also stopped and the data tape is driven in reverse until the leading edge of this second copy control pulse is driven a selected distance back behind the readout device. Then, to read out the next block of data, this whole process is repeated, starting with the second copy control pulse. This process repeats as many times as there are blocks of data to be transferred.

This technique keeps the gaps between blocks of data on the computer tape approximately constant, well within the tolerance set by the computer operating characteristics.

Further, in one version of this invention each copy control pulse has superimposed on it a code representing the address of a corresponding block of data. Thus the copy control pulses not only control the division of the continuously recorded data into data blocks but also give the location of each data block. By listing the addresses of selected blocks of data in a comparison circuit, only the selected blocks of data are transferred from the data tape to the computer tape. All data blocks are retained on the data tape for possible future reference.

In addition, a multiplexing arrangement is provided to allow only selected data in each block to be transferred to the computer tape.

This invention may be more fully understood from the following description taken together with the attached drawings.

DETAILED DESCRIPTION

Figure 1:
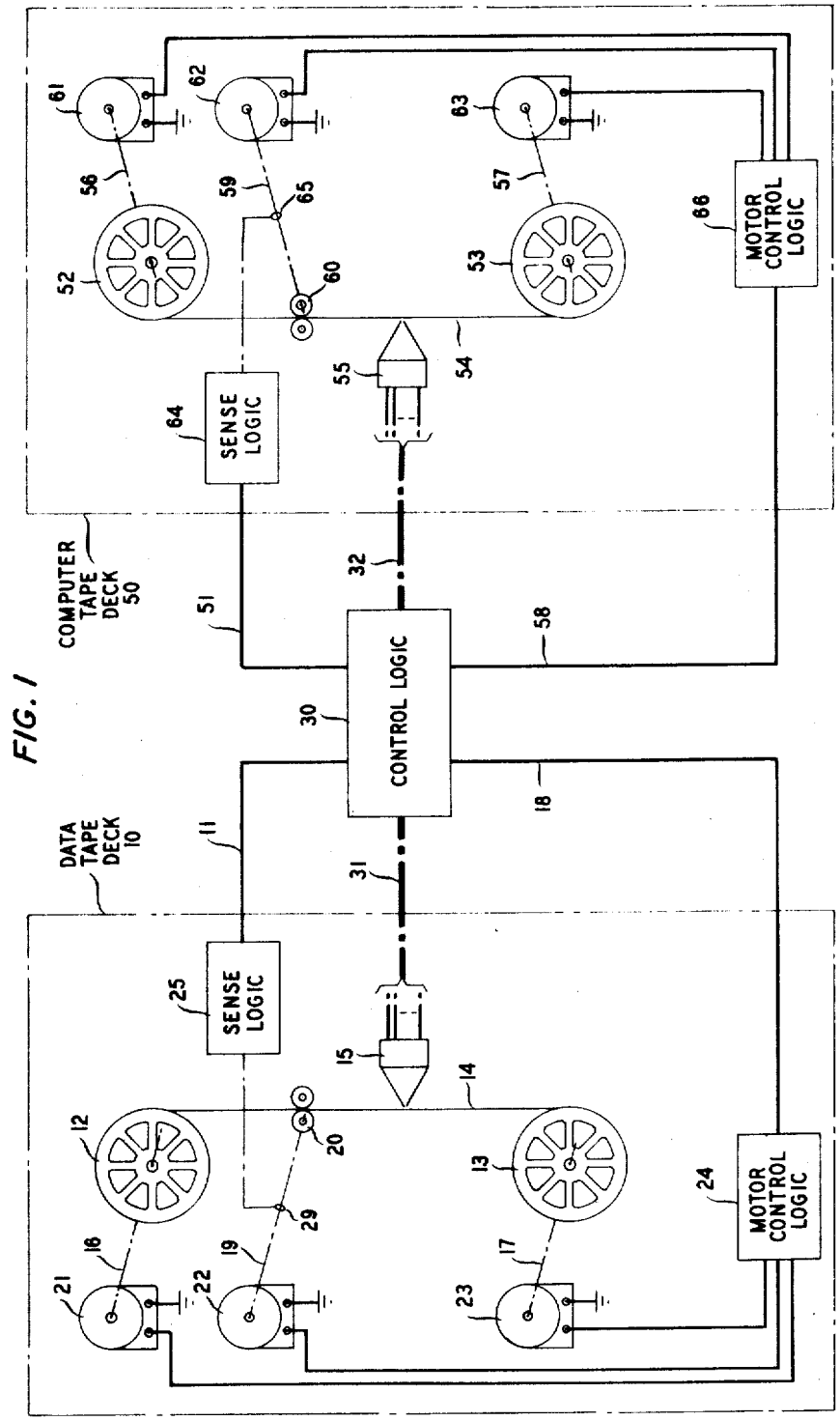
FIG. 1 is a schematic block diagram of a data transfer system using the principles of this invention.

FIG. 1 shows one embodiment of this invention. In FIG. 1, multitrack data tape 14, on which selected data has been continuously recorded, is driven in either the forward or reverse directions at selected velocities by capstan motor 22 through shaft 19. In cooperation with capstan motor 22, pickup motor 21 drives reel 12 through shaft 16 and rewind motor 23 drives data reel 13 through shaft 17.

Motor logic 24 sequentially starts and stops the motors 21, 22, and 23 in response to control signals transmitted on lead 18 from control logic unit 30. Control logic 30 generates these control signals in response to the leading and trailing edges of the copy control pulses on tape 14. These pulses are detected by readout head 15.

In addition, transducer 29 produces an output signal proportional to the direction of rotation of shaft 19. Sense logic 25 converts this output signal into a control signal which in turn is transmitted to control logic 30 on lead 11.

The information on tape 14 is detected by readout head 15 and transferred through control logic 30 to recording head 55. Head 55 places this information on computer tape 54, included in computer tape deck 50.

Deck 50 contains three drive motors just as does deck 10. Thus, pickup motor 61 and rewind motor 63 drive tape reels 52 and 53, respectively, by means of shafts 56 and 57. Capstan motor 62 drives capstan 60 through shaft 59. Motor control logic 66 starts and stops all three motors 61, 62, and 63 in response to signals transmitted from control logic 30 on lead 58. In addition, transducer 65 detects the direction of rotation of shaft 59 and transmits this information through sense logic 64 to control logic 30.

Tape decks similar to data tape deck 10 and computer tape deck 50 are well known in the computer arts and thus the structure of these decks will not be described in further detail. This invention, of course, is not limited to the use of tape decks identical to decks 10 and 50. For example, decks using only 1 or 2 drive motors can also be used in this invention with appropriate changes in motor control logic 24 and 66.

Figure 4A:
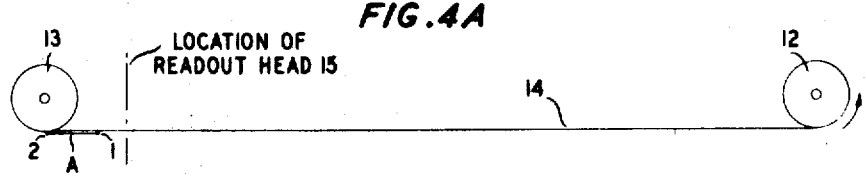
FIGS. 4A through 4I are schematic diagrams of the data tape during different stages of the data transfer process from the data tape to the computer tape.
Figure 4B:
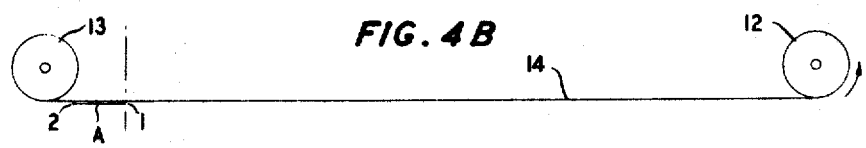
Figure 4C:
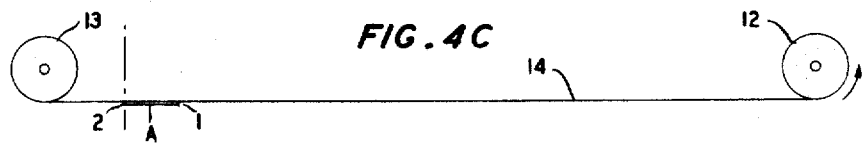

Before describing in detail the operation of control logic 30, the data transfer operation of this invention will be explained with the aid of FIG. 1 and FIGS. 4A through 4I. At the start of the data transfer operation, data reels 12 and 13 (FIG. 1) are driven in the forward direction, as shown in FIG. 4A. When leading edge 1 of copy control pulse A is detected by head 15 (FIG. 4B), tape 14 is running at its steady state speed and a signal is transmitted on lead 31 (FIG. 1) from recording head 15 (FIG. 1) to control logic 30. In response, control logic 30 generates a signal which is transmitted on lead 58 to motor control 66. Control 66 immediately starts motors 61, 62 and 63 to drive formerly quiescent tape 54 in the forward direction. By the time the trailing edge 2 of copy control pulse A is detected by readout head 15 (FIG. 4C), tape 54 is running at steady state speed in the forward direction. At this time, a pulse is generated by control logic 30 in response to this trailing edge. This pulse starts the transfer of data from data tape 14 to computer tape 54.

Figure 4D:
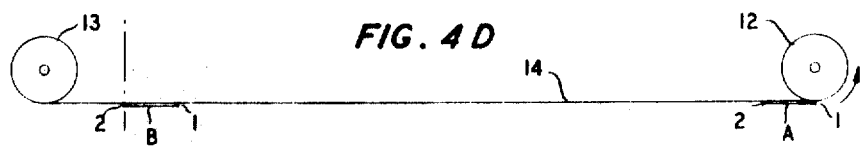
Figure 4E:
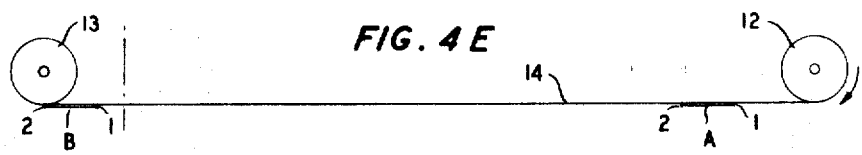

Data is continuously transferred, from readout head 15 to recording head 55, until the trailing edge 2 of the next following copy control pulse, labeled B in FIG. 4D, is detected. In response to this trailing edge, control logic 30 (FIG. 1) stops the transfer of data and signals motor control 66 to stop tape 54. Simultaneously, a signal to motor control 24 stops tape 14 and drives this tape in reverse for a selected period, until the leading edge of copy control pulse B is driven a selected distance back behind readout head 15. At the end of this period, data tape 14 is in the position shown in FIG. 4E.

Figure 4F:
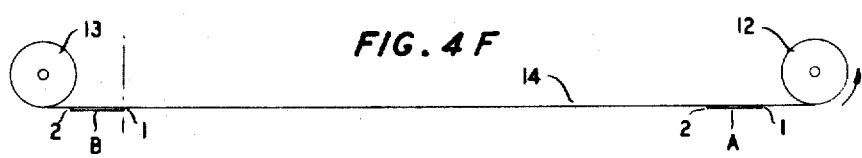
Figure 4G:
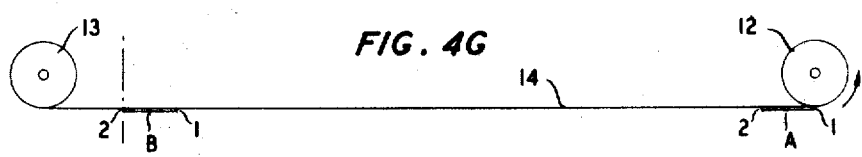
Figure 4H:
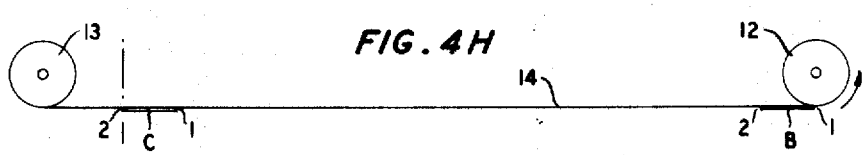
Figure 4I:
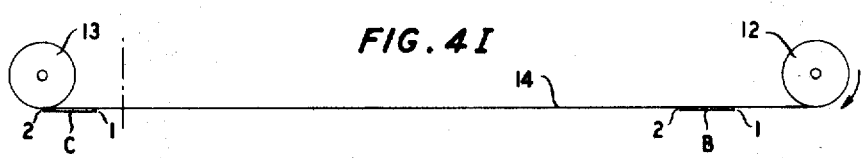

Tape 14 is now automatically driven in the forward direction again in response to a signal from motor control 24 (FIG. 1). When the leading edge 1 of copy control pulse B passes readout head 15, as shown in FIG. 4F, tape 14 is running at steady state speed and control logic 30 (FIG. 1) signals motor control 66 to start tape 54 in the forward direction again. When the trailing edge 2 of copy control pulse B is detected by head 15 (FIG. 4G), tape 54 (FIG. 1) is moving at its steady state speed and the end of the last data block transferred from tape 14 to tape 54 is a selected distance, proportional to the length of the copy control pulse B, beyond recording head 55. At this instant, data transfer is started again from tape 14 to tape 54. This transfer of data continues until the trailing edge 2 of copy control pulse C, shown in FIG. 4H, is detected. Then, data transfer is again stopped and signals, generated by control logic 30 (FIG. 1), stop tape 54, and stop and rewind tape 14 for a selected period. At the end of this time, tape 14 is positioned as shown in FIG. 4I and the above described process will be repeated, this time transferring the block of data between the trailing edge 2 of copy control pulse C and the trailing edge 2 of copy control pulse D (not shown). This process will be repeated as many times as there are blocks of data to be transferred from data tape 14 to computer tape 54.

The result of the stopping and starting of the data and computer tapes and of the rewinding of the data tape is to divide continuously recorded data on the data tape into blocks of data on the computer tape separated by gaps proportional to the lengths of the copy control pulses. And because the data blocks on the data tape are precisely defined by the trailing edges of the copy control pulses, no overlap nor loss of data occurs between contiguous data blocks.

Figure 5A:
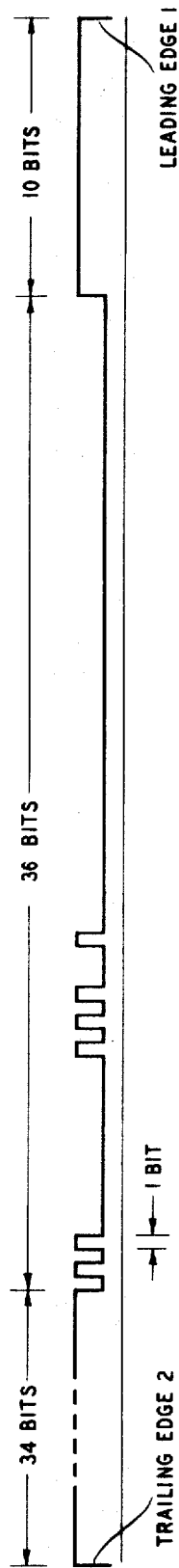
FIGS. 5A, 5B and 5C show a typical copy control pulse and two views of the multichannel data tape, respectively.

As shown schematically in FIG. 5A, a typical copy control pulse is 80 bits long. The copy control pulse is held at a constant voltage level for the first ten bits. However, the voltage levels of the next 36 bits are varied to represent the address of a selected block of data. The remaining bits of the copy control pulse are again maintained at a constant voltage level. It is to be understood that the copy control pulse shown in FIG. 5A is illustrative only. Other copy control pulses of different lengths and designs could also be used in this invention.

Figure 5C:
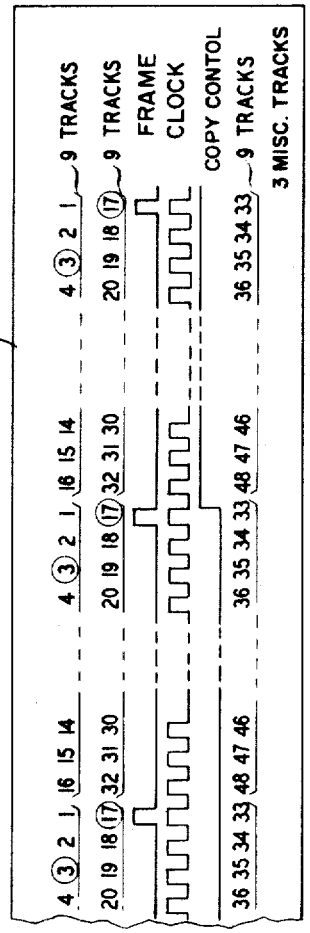
Figure 5B:
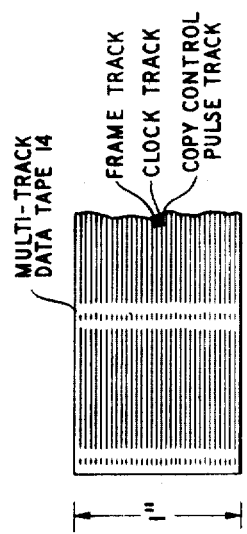

FIG. 5B shows a cross section of a typical multitrack data tape used in this invention. This tape contains 33 tracks. A track near the middle of the tape contains clock pulses placed on the data tape during the recording process. The track next to the clock track contains the copy control pulses, likewise placed on the data tape during the recording process. Intermediate tracks contain data bits, parity bits, framing bits, and other desired information. This invention will, of course, work with any of a large variety of multitrack data tapes.

Figure 2:
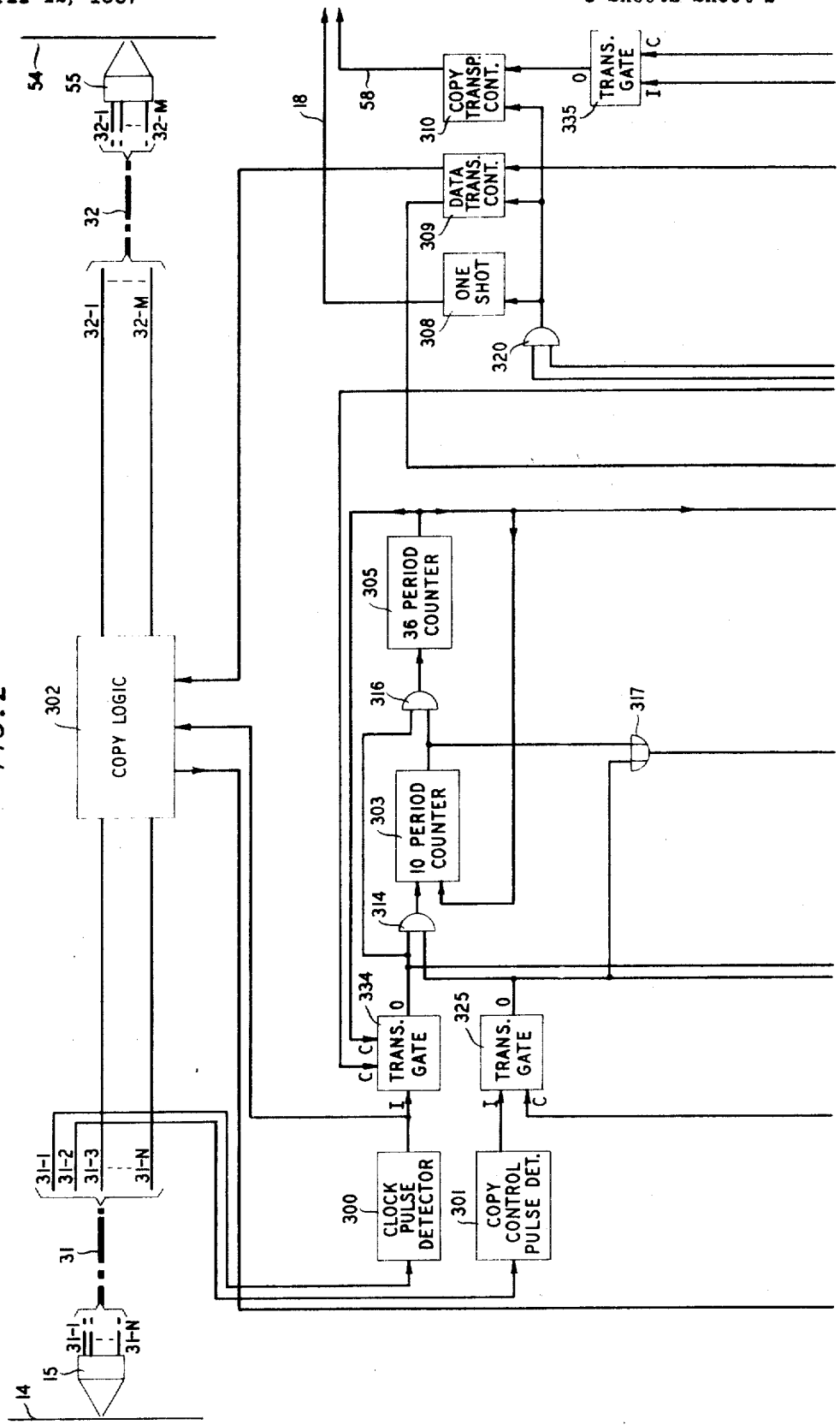
FIGS. 2 and 3 together comprise a schematic block diagram of control logic 30 shown in FIG. 1.
Figure 3:
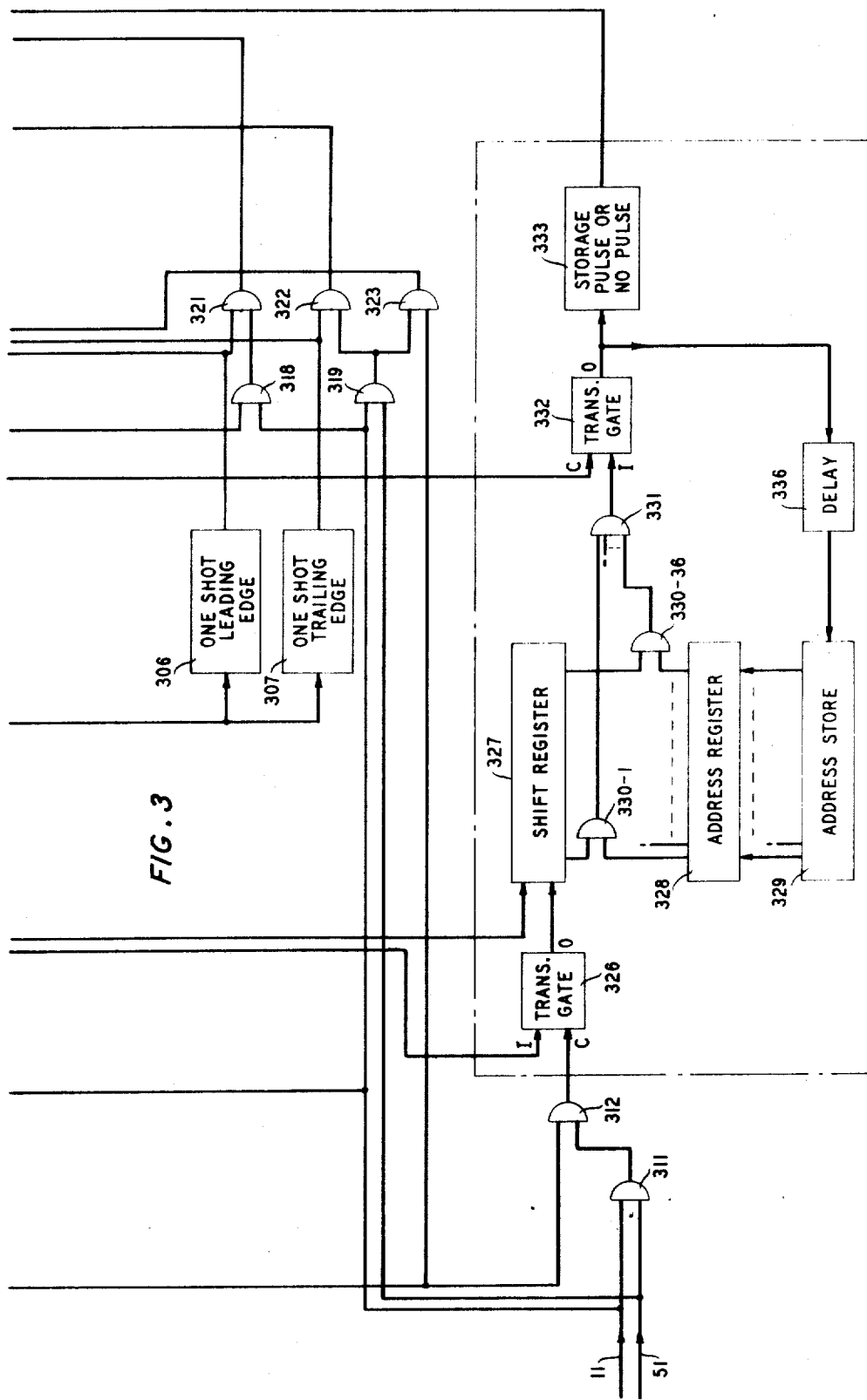

Control logic 30 is shown in more detail in FIGS. 2 and 3. The operation of control logic 30 will first be described assuming the copy control pulses to contain no addressing information. Then the additional logic necessitated by the addressing information will be described.

Tape 14 is, as described above, either moving forward or backward except for the brief instants when it is changing direction and thus at zero velocity. Thus, when tape 14 is moving in the forward direction, that is, being unwound from reel 13 and wound on reel 12 (FIG. 1), sense logic 25, together with transducer 29, produces a signal indicating that tape 14 is moving in the forward direction. This signal, transmitted to logic 30 on lead 11, opens normally closed transmission gate 325 (FIG. 2) and, in addition, is transmitted to AND gates 311, 318 and 319, shown in FIG. 3. For convenience, the input, output, and control leads to all transmission gates are labeled I, O, and C, respectively.

When the leading edge of a copy control pulse is detected, copy control pulse detector 301, basically a shaping network, produces an output waveform resembling the copy control pulse. This output waveform passes through gate 325 and activates OR gate 317, which in turn produces an output waveform, the leading edge of which activates one shot 306 (FIG. 3). The pulse from one shot 306 is sent to one input lead of AND gate 321. At this time, of course, no data is being copied from data tape 14 to computer tape 54. Thus data transfer control 309 sends a signal, indicating that no data is being transferred, to one terminal of AND gate 318. The other input terminal of AND gate 318 contains the signal transmitted on lead 11 indicating that data tape 14 is moving in the forward direction. Thus, AND gate 318 produces a signal on the other input lead of gate 321. Gate 321, therefore, responds to the pulse from one shot 306 by producing an additional pulse which, when transmission gate 335 is open, turns on copy transport 310. The function of gate 335, part of the circuit for checking the address information on the copy control pulse, will be described later.

Copy transport 310 in turn produces a signal which is transmitted on lead 58 to motor control logic 66 (FIG. 1), thereby activating motors 61, 62 and 63. Tape 54 is thus rapidly brought to steady state speed in the forward direction.

The lengths of the copy control pulses are such that tape 54 reaches steady state speed in the forward direction before the trailing edge of a copy control pulse is detected. When the trailing edge of a copy control pulse is detected, the voltage of the waveform from detector 301 drops to zero. This voltage drop travels through OR gate 317 and activates one shot 307. One shot 307 sends a pulse to one input lead of AND gate 322. The other input lead of gate 322 receives the output signal from AND gate 319. Gate 319 in turn produces an output signal only if sense logic units 25 and 64 (FIG. 1) indicate that tapes 14 and 54, respectively, are both traveling in the forward direction. Therefore, if the copy transport 310 has been activated by the leading edge of a copy control pulse, gate 322 produces an output signal, when the trailing edge of a copy control pulse is detected, which activates data transfer control 309. Control 309, in turn, signals copy logic 302 to begin transferring data from tape 14 to tape 54.

Data transfer continues until the trailing edge of the next following copy control pulse is detected. (The leading edge of this next following copy control pulse has no effect on the data transfer.) At this time, the trailing edge of the output waveform from copy control pulse detector 301 passes through OR gate 317 and activates one shot 307. AND gate 322 produces an output pulse at this time, but data transfer control 309 already has turned on copy logic 302 and thus this pulse has no effect on control 309. However, AND gate 323 is now producing an output signal in response to a signal from AND gate 319 and a signal from copy logic 302 indicating that data is being transferred from tape 14 to tape 54. The output signal from gate 323 is sent to gate 320. Gate 320 responds to the simultaneous presence of output signals from gate 323 and one shot 307 by producing an output signal. This output signal terminates the transfer of data by changing the state of transfer control 309, stops tape 54 by means of a signal from copy transport 310, and stops tape 14 and then drives it in reverse for a selected period. This last operation is initiated by one shot 308.

Tape 14 is driven in reverse until the leading edge of the copy control pulse which terminated the transfer of data is driven a selected distance behind readout head 15. This distance is determined by the maximum inertias of the data tape reels 12 and 13. At the end of this period, the pulse from one shot 308 terminates. Motor control logic 24 (FIG. 1) then activates motors 21, 22 and 23 to drive tape 14 in the forward direction again.

The above described process repeats as many times as there are blocks of data to be transferred from data tape 14 to computer tape 54.

So far, the operation of this invention has been described assuming the copy control pulses to contain only leading and trailing edges. The superposition of address pulses on the middle of each copy control pulse makes necessary additional logic to prevent the leading and trailing edges of address pulses from being interpreted as leading and trailing edges of copy control pulses. In addition, apparatus must be provided to "read" the addresses superimposed on the copy control pulses and to compare these addresses to the addresses of blocks of data selected to be transferred.

The leading and trailing edges of address pulses are prevented from being interpreted as leading and trailing edges of copy control pulses as follows. Transmission gate 325 passes each copy control pulse detected during the forward motion of tape 14. Transmission gate 334, normally open, passes clock pulses from clock pulse detector 300, which detects and shapes the clock pulses recorded on data tape 14 (FIGS. 5B and 5C), to AND gate 314. Thus the copy control pulse passed through transmission gate 325 enables AND gate 314 to produce a series of pulses at the clock pulse frequency. These pulses activate 10-period counter 303. After ten clock pulses, counter 303 produces an output signal and holds this output signal until reset by a signal from 36-period counter 305. The output signal from counter 303 clamps the output signal from OR gate 317 at the voltage level of the first ten bits of the copy control pulse. Thus the 36 address bits superimposed on the copy control pulse do not pass through OR gate 317.

AND gate 316 produces output pulses in response to the simultaneous presence of clock pulses from detector 300 and the output signal from 10-period counter 303. These output pulses drive 36-period counter 305. After 36 clock pulses, counter 305 produces an output pulse indicating it has reached its maximum count level. This output pulse resets 10-period counter 303, and closes transmission gate 334. The resetting of 10-period counter 303 automatically unclamps OR gate 317. Closing gate 334 prevents counter 303 from immediately beginning to recount the clock pulses from detector 300. Thus OR gate 317 is able to pass the drop in voltage associated with the trailing edge of the copy control pulse.

The output pulse from one shot 306, generated by the rise in voltage associated with the leading edge of the next following copy control pulse, reopens transmission gate 334.

It is, in addition, necessary that the address information superimposed on the copy control pulses be stored and compared to selected addresses in order to determine whether or not the associated data blocks are to be transferred from the data tape to the computer tape. Shift register 327 (FIG. 3), address register 328, and address store 329, together with gates 330–1 through 330–36, AND gate 331, transmission gates 326, 332, and 335, delay 36, and storage 333 are provided to carry out this function.

Transmission gate 326 is normally open, being closed only when the data tape and the computer tape are being driven in the forward direction and data is being transferred. When the data tape is being driven in the forward direction but the computer tape has not yet been started, transmission gate 326 passes copy control pulses. The leading edge of a copy control pulse, as described above, starts the computer tape, provided transmission gate 335 is open. Gate 335 is opened or closed by the presence or absence, respectively, of a pulse in store 333. The presence of such a pulse, derived from the last copy control pulse, indicates that the block of information following the presently detected copy control pulse is to be transferred.

The leading edge of the copy control pulse is passed into shift register 327, driven by pulses from clock pulse detector 300. Shift register 327 contains 36 binary stores. Thus, a bit travels through register 327 in 36 clock pulses. The address information stored on a copy control pulse consists of 36 bits in the embodiment described herein. Gate 326 passes these address bits. The 36 bits, representing the address of a selected block of data, are stored in register 327 for a brief interval immediately following the detection of the 36th address bit by head 15. The address of a selected block of data to be transferred is simultaneously contained in address register 328. If, at the instant register 327 contains the address information stored on the copy control pulse, the information in register 327 identically matches the address stored in register 328 the gates 330–1 through 330–36 simultaneously produce output pulses. AND gate 331 detects the simultaneous presence of output pulses from all the gates 330 and in turn produces an output pulse indicating that the information stored in the two registers matches. Transmission gate 332 is opened for this brief moment by the pulse from 36 period counter 305. Thus, the pulse from AND gate 331 passes through transmission gate 332 and is stored in storage 333.

The address stored in register 328 represents the address not of the block of data next following the copy control pulse from which the address was derived, but rather of the second following block of data. This is necessary because, when the leading edge of a copy control pulse is detected, it must already be known whether the block of data following the trailing edge of this copy control pulse is to be transferred. If this block of data is to be transferred, the computer tape must be turned on by this leading edge to obtain the proper interrecord gap between the block of data last placed on the computer tape and this block of data. Thus, if the block of data next following a copy control pulse is to be transferred from the data tape to the computer tape, transmission gate 335 will already have been opened by a pulse derived from the previous address check and stored in storage 333.

If, however, the previous address check indicated that the block of data next following a copy control pulse is not to be transferred, storage 333 will contain no pulse when the leading edge of this copy control pulse is detected. Transmission gate 335 will thus be closed, and copy transport 310 will not turn on computer tape 54.

If the previous address check indicated that the block of data next following a copy control pulse is to be transferred from the data tape to the computer tape, the computer tape 54 will have been driven in the forward direction in response to the leading edge of this copy control pulse. When the trailing edge of this copy control pulse is detected, data transfer will begin. Immediately gate 326 will be closed by a signal from AND gate 312. This prevents the address information int he next following copy control pulse from prematurely changing the address pulse stored in storage 333 while data is being transferred. Thus, at the end of this block of data, computer tape 54 will be stopped by the trailing edge of this next following copy control pulse. Then gate 326 will be opened by the stopping of data transfer and the address detecting circuit will again be operative.

Address store 329 contains the addresses of the data blocks to be transferred from data tape 14 to computer tape 54. Address store 329, in one embodiment, comprises a magnetic memory, either disc, tape, or drum, with appropriate readout apparatus. Address store 329 could, of course, be a punched card reader, switches, or, indeed, a computer. Address store 329 changes the address stored in register 328 in response to the signal from AND gate 331, delayed a selected duration in element 336. It is of course understood that the addresses of the data blocks to be transferred should be arranged in address store 329 in a sequence compatible with the addressing on the data tape.

In order to prevent spurious signals from being generated by the copy control pulses and the address information on the copy control pulses when the data tape is being driven in reverse, transmission gate 325 is provided. This gate is open only when the data tape is driven in the forward direction and is closed for all other conditions. Alternatively, data tape 14 is lifted from contact with readout head 15 while being driven in reverse.

Figure 6A:
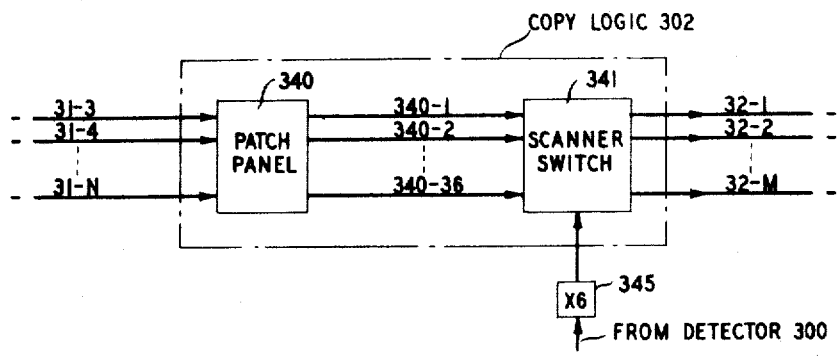
FIGS. 6A, 6B and 6C show in more detail copy logic 302 from FIG. 2.
Figure 6B:
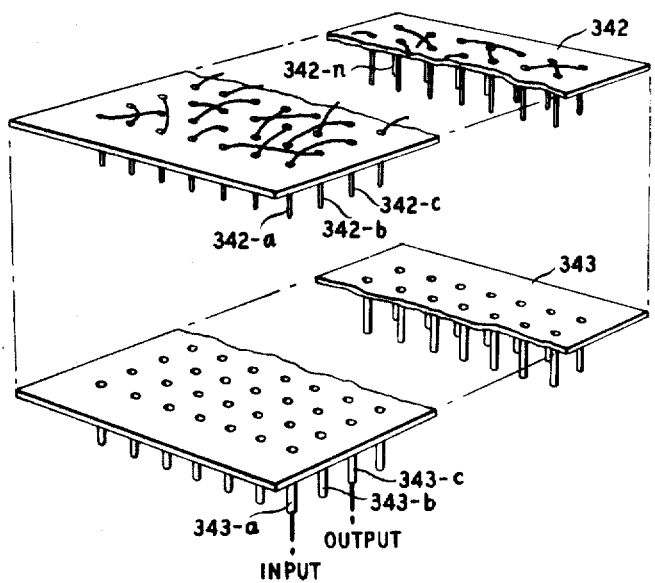

FIG. 6A shows copy logic 302 in FIG. 2 in more detail. Input leads 31–3 to 31–N, where N is a selected positive integer, enter patch panel 340. Panel 340, shown in FIG. 6B, is composed of a plug board 342 containing a plurality of pins 342–a, 342–b, etc., and a receptacle 343, containing a corresponding plurality of receiving sockets 343–a, 343–b, etc. The input and output leads to patch panel 340 are connected to the hollow receiving sockets in receptacle 343. Each input lead 31 is joined to the desired output lead 340–i, where i is a positive integer, by wiring together the pins on board 342 corresponding to the input and output leads to be joined. One input lead can, if necessary, be connected to more than one output lead. Thus the number of input and output leads do not necessarily have to correspond.

The output leads from panel 340 are scanned by scanner switch 341 to convert the information on these leads from a parallel arrangement to a partial serial arrangement. As an example, in one embodiment, scanner 341, driven at six times the frequency of the clock pulses on the data tape by a signal from frequency multiplier 345, scans the output leads from panel 340 in groups of six. Each group of six output leads is scanned in one-sixth the time readout head 15 (FIG. 1) dwells on a one bit length of tape 14. Thus scanner 341 converts up to 36 parallel recorded bits into up to six serial groups or "characters" of six parallel bits each. The output bits from scanner 341 are sent, as shown in FIG. 2, directly to record head 55.

Scanner switch 341 is of a design well known in the switching arts and thus will not be described in further detail.

Figure 6C:
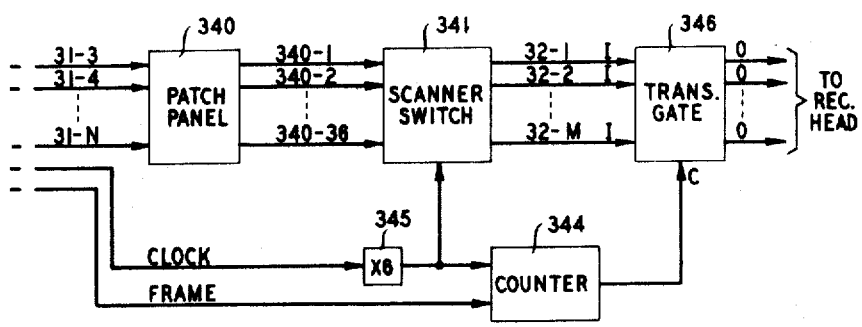

Another version of copy logic 302 is shown in FIG. 6C. Here, patch panel 340 and scanner switch 341 work as described previously. However, the addition of transmission gate 346 and counter 344 makes possible the transfer to a computer tape or a computer memory, only of selected data recorded on data tape 14. Before describing in further detail how this version of copy logic 302 works, the way in which data is arranged on the multitrack data tape will be described. FIG. 5C shows this arrangement. Other arrangements, of course, can also be used.

For the purpose of explaining FIG. 5C, it will be assumed that data from 48 different input channels is stored on data tape 14. Tape 14 has 33 recording tracks. Twenty-seven of these tracks are used to record data. The remaining 6 tracks contain clock pulses, framing pulses, parity pulses, the all-important copy control pulses, and other desired information. During data acquisition, each of the 48 input signals on the 48 input channels are periodically sampled and the resulting samples are converted into 9-bit code words. The bits in each code word are recorded in parallel on 9 selected tracks of data tape 14. The bits representing 3 samples can be recorded simultaneously on 27 tracks of data tape 14. Thus, samples from 3 input signals can be recorded on data tape 14 at any one time. A multiplexing arrangement, of a type well known in the signal processing arts, permits sampling once all 48 input signals in the time between the obtaining of contiguous samples from a given set of 3 input signals. Thus, data is placed on multitrack data tape 14 at a rate 16 times that at which any one input signal is sampled. For convenience, the 48 input signals are divided into 3 groups, each containing 16 input signals. A first group contains samples of input signals 1 through 16, a second group contains samples of input signals 17 through 32, and a third group contains samples of input signals 33 through 48. The samples of the signals in each of these groups are placed periodically and in sequence on the same 9 tracks of multitrack data tape 14. FIG. 5C shows this arrangement.

A framing pulse is placed on tape 14 simultaneously with the bits representing samples of input signals on channels 1, 17, and 33. Next, bits representing samples of input signals on channels 2, 18 and 34 are placed on tape 14. This process continues until, just before the next framing pulse, bits representing samples of signals on channels 16, 32 and 48 are placed on tape 14. Then, simultaneously with the next framing pulse, bits representing the next samples of the signals on channels 1, 17, and 35 are placed on tape 14.

Often it is desired to analyze only selected data. Thus, the samples of input signal 3 and input signal 17, for example, might be of interest. To read out all the data from the data tape and then select the desired data is time consuming and wasteful. The apparatus shown in FIG. 6C makes it possible to read out the desired data only. Counter 344 is started by framing pulses read out from the multitrack data tape. As shown in FIG. 5C, each framing pulse represents the start of each of the three groups of samples recorded on tape 14. Clock pulses, derived from the clock pulses on tape 14 by detector 300 (FIG. 2), are used to generate pulses at 6 times the clock frequency by means of network 345. These new high frequency pulses drive counter 344 so that the output signal at any instant from counter 344 represents a corresponding one of 96 characters of either six or three bits each. These characters are produced by scanner switch 341 from each set of 48 samples from the 48 input signals. The first such character contains six of the nine bits representing a sample of the input signal on channel 1. The second character contains the last three bits representing this sample. The last three bits of this second character are zero. The third character contains six of the nine bits representing a sample of the input signal on channel 17. The fourth character contains the last three bits representing this sample. And so on in sequence through all 48 of the 9-bit words representing 48 consecutive samples of the 48 input signals. Of course, other arrangements of bits between characters can also be used, if desired. Counter 344 also contains a selected number of comparison circuits, of the type used in the address comparison circuit shown in FIG. 3. These comparison circuits can be set by an operator to correspond to the characters representing samples of input signals on selected channels. Whenever the count in counter 344 matches the count in the comparison circuits, counter 344 produces an output pulse which opens transmission gate 346. Gate 346, in turn, passes the selected character to record head 55 (FIG. 1). In this manner, only the desired information is read out from the data tape.

Other embodiments of this invention will be obvious to those skilled in data processing in light of this disclosure. In particular, apparatus using the principles of this invention for transferring continuously recorded data, in blocks, from a data tape directly to a computer memory without the use of a buffer, will be obvious in light of this invention.

I claim:

1. The method of transferring data from a data tape to a computer tape, which comprises:
    bringing the data tape to a first selected speed before the leading edge of an $i^{th}$ copy control pulse on said data tape is detected, where $i$ is an interation index equal initially to one (1),
    bringing the computer tape to a second selected speed after the leading edge of said $i^{th}$ copy control pulse is detected and before the training edge of said $i^{th}$ control pulse is detected,
    transferring data from said data tape to said computer tape on the detection of the trailing edge of said $i^{th}$ copy control pulse,
    stopping the transfer of data and the data and computer tapes on the detection of the trailing edge of the $(i+1)^{th}$ copy control pulse,
    driving the data tape in reverse a selected duration, and
    iteratively repeating the above steps a selected number of time cumulatively increasing the index $i$ by one (1) each iteration.

2. The method of transferring data in blocks from a data tape containing continuously recorded data and a sequence of copy control pulses, to a computer tape, which comprises:
    (1) determining whether the block of data following the first copy control pulse on said data tape is to be transferred to said computer tape,
    (2) bringing the data tape to a first selected speed before the leading edge of the $i^{th}$ copy control pulse on said data tape is detected, where $i$ is an iteration index equal to one (1) on the first iteration,
    (3) if the block of data following said $i^{th}$ copy control pulse is to be transferred,
        (3a) bringing said computer tape to a second selected speed before the trailing edge of said $i^{th}$ copy control pulse is detected,
        (3b) reading address information superimposed on said $i^{th}$ copy control pulse,
        (3c) determining whether the block of information following the $(i+1)^{th}$ copy control pulse is to be transferred to said computer tape by comparing the address information on said $i^{th}$ copy control pulse with the address of the next block of information to be read out from said data tape,
        (3d) starting the transfer of data from said data tape to said computer tape on detecting the trailing edge of said $i^{th}$ copy control pulse,
        (3e) stopping the transfer of data, the computer tape, and the data tape on detecting the trailing edge of said $(i+1)^{th}$ copy control pulse,
        (3f) driving the data tape in reverse a selected duration,
        (3g) iteratively repeating steps 2 and 3 or 4 a selected number of times, cumulatively adding one to the index $i$ each iteration, and,
    (4) if the block of data following said $i^{th}$ copy control pulse is not to be transferred,
        (4a) reading address information superimposed on said $i^{th}$ copy control pulse,
        (4b) determining whether the block of information following the $(i+1)^{th}$ copy control pulse is to be read out by comparing the address information on said $i^{th}$ copy control pulse with the address of the next block of information to be read out from said data tape, and
        (4c) iteratively repeating steps 3 or 4 a selected number of times, cumulatively adding one to the index $i$ each iteration.

3. Apparatus which comprises:
    a data tape deck including a data tape containing both continuously recorded data and periodically recorded copy control pulses,
    a computer tape deck including a computer tape, on which blocks of data are separated by gaps, and
    means, responsive to the leading and trailing edges of said copy control pulses, for transferring blocks of said continuously recorded data from said data tape to said computer tape.

4. Apparatus as in claime 3, in which said means for transferring includes:
    means, responsive to address information superimposed on said copy control pulses, for transferrng only preselected blocks of data from said data tape to said computer tape.

5. Apparatus as in claim 3 in which said means for transferring includes:
    means for transferring in sequence all the blocks of data from said data tape to said computer tape.

6. Apparatus as in claim 3 in which said means for transferring includes:
    means for indicating that the block of data following a selected copy control pulse is to be transferred from said data tape to said computer tape,
    means, responsive both to the leading edge of said selected copy control pulse and to said indicating means, for driving said computer tape in the forward direction,
    means, responsive to the address information superimposed on said selected copy control pulse, for determining whether the second block of data following said selected copy control pulse is to be transferred from said data tape to said computer tape,
    means, responsive to the trailing edge of said selected copy control pulse, for transmitting the block of data following said trailing edge from said data tape to said computer tape,
    means, responsive to the trailing edge of the copy control pulse next following said selected copy control pulse, for stopping the computer tape and the transmitting of data and for driving said data tape in reverse a selected duration, and means for driving said data tape in the forward direction after said selected duration.

7. Apparatus for transferring blocks of continuously recorded data from a data tape to a computer tape on which adjacent blocks of data are separated by gaps, which comprises:

means for determining, in sequence, whether each block of data recorded on said data tape is to be transferred to said computer tape, means, responsive both to said determining means and to the leading and trailing edges of copy control pulses placed on said data tape, for controlling the transfer of selected blocks of data from said data tape to said computer tape, and means, responsive to said controlling means, for transferring selected blocks of data from said data tape to said computer tape, said transferring means including:

means for reading out said data from said data tape, means for rearranging the readout data, and means for recording the rearranged data on said computer tape.

8. Apparatus as in claim 3 in which said means for transferring includes:

means for indicating that the block of data following a selected copy control pulse is to be skipped over, means, responsive both to the leading edge of said selected copy control pulse and to said indicating means, for preventing the motion of said computer tape, and means responsive to the address information superimposed on said selected copy control pulse, for determining whether the second block of data following said selected copy control pulse is to be transferred from said data tape to said computer tape.

9. Apparatus for transferring selected information from a data tape containing framing and clock pulses to a computer tape, which comprises:

means, responsive to said clock pulses, for producing control pulses with a frequency a selected multiple of the frequency of said clock pulses, means, responsive to said control pulses, for converting a plurality of parallel-arranged data bits on said data tape into a multiplicity of serially arranged data characters, each character containing a selected number of parallel-arranged bits, means, responsive to said control pulses and said framing pulses, for producing gating pulses simultaneously with the generation, by said converting means, of selected characters containing said selected information, means for recording said selected characters on said computer tape, and means, responsive to said gating pulses, for passing said selected characters to said recording means.

References Cited

UNITED STATES PATENTS

| | | | |
|---|---|---|---|
| 2,976,372 | 3/1961 | Sampson | 179—100.2 |
| 3,028,454 | 4/1962 | Kohorn | 179—100.2 |
| 3,064,561 | 11/1962 | Mauduit | 101—93 |
| 3,206,133 | 9/1965 | Forster et al. | 340—172.5 X |
| 3,260,340 | 7/1966 | Locklar et al. | 197—20 X |
| 3,315,242 | 4/1967 | Haddad | 179—100.2 |
| 3,365,702 | 1/1968 | Heatwole | 340—172.5 |
| 3,405,238 | 10/1968 | Hurvitz | 340—174.1 |

OTHER REFERENCES

I.B.M. Technical Disclosure Bulletin, vol. 9, No. 12, May 1967, pp. 1725–1727.

PAUL J. HENON, Primary Examiner

P. R. WOODS, Assistant Examiner

U.S. Cl. X.R.

179—100.2; 340—174.1